United States Patent Office 3,709,812
Patented Jan. 9, 1973

3,709,812
CARBON DIOXIDE SENSOR
Leonard W. Niedrach and John A. Bergeron, Schenectady, N.Y., assignors to General Electric Company
Filed Oct. 16, 1970, Ser. No. 81,197
Int. Cl. G01n 27/46
U.S. Cl. 204—195 P     3 Claims

ABSTRACT OF THE DISCLOSURE

A carbon dioxide sensor has an elongated flexible current collector, an electrochemically active region of hydrided palladium with a surface coating of platinum black in electrical contact with a portion of the current collector, a second elongated flexible current collector surrounding the first current collector, a second electrochemically active region of silver and silver halide in electrical contact with the second current collector, a first layer of electrical insulation disposed between the first and second current collectors, a second layer of electrical insulation disposed over the second current collector, an anion exchange resin electrolyte contacting both electrochemically active regions, and an outer sheath of carbon dioxide diffusion barrier material encapsulating at least the electrochemically active regions and the electrolyte.

---

Reference is made to copending patent application entitled "Sensor and Method of Making" file Sept. 4, 1970, and given Ser. No. 69,650, which describes and claims a sensor including an ion exchange resin electrolyte and methods of manufacture. This copending application, in the name of Leonard W. Niedrach, is assigned to the same assignee as the present application.

This invention relates to carbon dioxide sensors and, more particularly, to carbon dioxide sensors employing as one of the sensing elements an electrochemically active region of hydrided palladium with a surface coating of platinum black.

Carbon dioxide sensors are known in the prior art for determining carbon dioxide content of a sample. Such a sensor has a pH sensitive electrode, an electrolyte whose pH is sensitive to the partial pressure of carbon dioxide in equilibrium with it, a counter-reference electrode insensitive to changes in pH or bicarbonate concentration, and a diffusion barrier that is permeable to carbon dioxide but isolates the electrochemical sensing elements from the system to be monitored. In operation, the terminal voltage is a definite function of the partial pressure of the carbon dioxide in equilibrium with it.

Our present invention is directed to an improved carbon dioxide sensor which is suitable for biomedical, environmental control and other applications.

The primary objects of our invention are to provide a rugged, dependable and miniaturized carbon dioxide sensor.

In accordance with one aspect of our invention, a carbon dioxide sensor comprises a first elongated flexible current collector, an electrochemically active region of hydrided palladium with a surface coating of platinum black in electrical contact with a portion of the current collector, a second elongated flexible current collector surrounding at least partially the first current collector, a second electrochemically active region of silver and silver halide in electrical contact with the second current collector, a first layer of electrical insulation disposed between said first and second current collectors, a second layer of electrical insulation disposed over the second current collector, an anion exchange resin electrolyte contacting both electrochemically active regions, and an outer sheath of carbon dioxide diffusion barrier material encapsulating the electrochemically active regions and the electrolyte.

These and various other objects, features and advantages of the invention will be better understood from the following description taken in connection with the accompanying drawing in which:

The single figure is a sectional view of a portion of a carbon dioxide sensor made in accordance with our invention.

In the single figure of the drawing, there is shown generally at 10 a portion of a carbon dioxide sensor embodying our invention. Sensor 10 is shown with a first elongated flexible current collector 11 in the form of a 20 mil palladium wire with an electrochemically active region 12 of hydrided palladium with a surface coating of platinum black in electrical contact with the lower end portion thereof. This electrochemically active region 12 provides the sensing electrode. A first layer of electrical insulation 13 in the form of Alkanex polyester resin lacquer surrounds current collector 11 but electrode 12 is exposed. A second elongated current collector 14 of silver paint surrounds at least partially the first current collector 11 whereby electrical insulation 13 is disposed between current collectors 11 and 14. Current collector 14 can be in a variety of configurations including a stripe, wire, etc. Such current collectors surround at least partially the first current collector. A second electrochemically active region 15 consists of silver and silver chloride on the lower portion of silver current collector 14. The electrochemically active region 15 provides the reference electrode. An anion exchange resin electrolyte 16 of quaternized polystyrene partially in its bicarbonate form and partially in its chloride form contacts both electrochemically active regions 12 and 15, respectively, by bridging first polymer electrical insulation 13. A carbon dioxide diffusion barrier material 17 of silicone-polycarbonate is disposed over second current collector 14 as a layer of electrical insulation and encapsulates as an outer sheath the electrochemically active regions 12 and 15, and electrolyte 16. If desired, a separate layer of electrical insulation can surround current collector 14. The resulting device is a potentiometric carbon dioxide sensor.

We found that we could form the above improved carbon dioxide sensor by a method of applying successive elements from various organic solutions after which each solution solvent was evaporated. The application of the successive layers is preferably accomplished by immersion steps but other suitable means include coating, spraying, brushing, etc. The use of immersion steps is described and claimed in the above referenced copending application Ser. No. 69,650.

The carbon dioxide sensor of our invention can be formed by employing for the initial support wire forming the current collector, a noble metal such as palladium. Other non-corrodible metals can be also used. The first electrochemically active region which can be employed for the sensing electrode is hydrided palladium with a surface coating of platinum black. In the event that a metal other than palladium is employed, a layer of palladium must be deposited on at least a portion thereof so that the portion can be hydrided. The second current collector can be silver or gold. If gold is employed, silver is deposited on at least a portion thereof. Second electrochemically active region which can be employed for the reference electrode are silver-silver halides except fluorides.

Various electrical insulating materials are useable and many of such materials can be applied by coating steps. Preferred materials include Viton hexafluoropropylene-vinylidene fluoride rubber, Alkanex polyester resin lacquer, silicone rubbers, and polypropylene oxides. We prefer to employ Alkanex polyester resin lacquer which provides the desired electrical insulation and which can be applied by coating or dipping. The Alkanex polyester resin lacquer can be crosslinked by heating to insolubilize and thereby facilitate the application of successive layers. We found that various carbon dioxide diffusion barrier materials are suitable as an outer sheath to encapsulate at least the electrochemically active regions and the electrolyte. The carbon dioxide diffusion barrier material must be electrically insulating and have an appropriate permeability coefficient for the carbon dioxide to be sensed. Since these materials are electrically insulating, the carbon dioxide diffusion barrier sheath and the second layer of insulation can be made of one of these materials. Thus, the separate second layer of electrical insulation can be eliminated. Suitable materials which have been employed include silicone-polycarbonate copolymers, Viton hexafluoropropylene-vinylidene fluoride rubber and silicone rubbers.

An anion exchange resin can be employed as the electrolyte in our sensor and can be applied by coating. Various exchange membrane materials are known. For example, reference is made to such preparation and properties of a number of different types of such resins in U.S. Pat. No. 3,134,697 entitled "Fuel Cell" which issued in the name of Leonard W. Niedrach and is assigned to the same assignee as the present application. With this anion exchange resin type carbon dioxide sensor, suitable electrolytes include a terpolymer of methyl methacrylate, divinylbenzene and 2-hydroxy-3-trimethylammonium propyl methacrylate partially in the bicarbonate form and partially in the chloride form and quaternized polystyrene partially in the bicarbonate form and partially in the chloride form.

A quaternized polystyrene is a polystyrene which is partially converted to a quaternary amine derivative. The manufacture of this electrolyte involves the chloromethylation and subsequent quaternization of polystyrene.

EQUATION 1

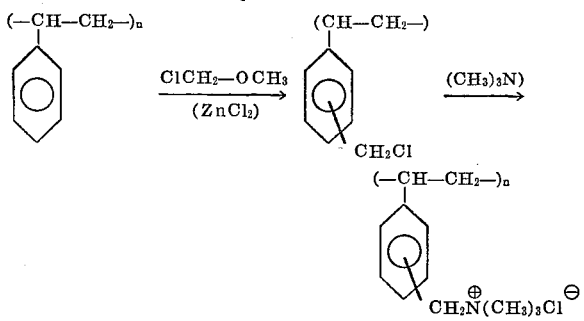

Both reaction steps are known and appear in the literature; however, whereas the known processes generally strive for a high content of ionic groups in the polymer, it is critical for the present application that a certain relatively low level of ammonium groups be present in the polymer, the fairly narrow limits of substitution being prescribed by insufficient conductivity on the one hand and excessive swelling in water on the other. The following reproducible procedure describes attaining the desired level of chloromethylation of the polymer and the conversion of the intermediate into the quaternized polyelectrolyte.

The chloromethylation of polystyrene is carried out to obtain optimal values which correspond to chlorine contents of 4.0–6.5% for the chloromethylated but not quaternized resin, about 1 chloromethyl group for every 5 to 8 repeat units. Polystyrene is generally chloromethylated in chloromethylmethylether as the alkylating agent with zinc chloride as a catalyst, without use of a solvent or diluent. This procedure leads to a rapid reaction and high levels of substitution. This method does not lend itself well to the synthesis of the product required for the present application.

The procedure adopted for the synthesis of a product containing the desired level of chloromethyl substitution requires a 15-fold excess over the stoichiometrically required amount of chloromethylmethylether. Methylene chloride is used as an inert solvent and diluent and anhydrous zinc chloride is added as a catalyst. No crosslinking is observed under these conditions and the reaction time of around 3 hours is sufficiently long that the time elapsed between monitoring the progress of the reaction and quenching has little effect on the product.

After the reaction mixture has attained the desired viscosity, the reaction is quenched by adding a specified amount of 20% water in dioxane and the product is then isolated by adding the reaction mixture with stirring to methanol. The white, fibrous precipitate is collected, air-dried and redissolved in dioxane. A second precipitation step with water as the precipitant is carried out in the same manner; in this way, the complete removal of zinc salts is assured.

The quaternization of chloromethyl polystyrene is accomplished by the reaction of chloromethyl polystyrene with trimethylamine according to Equation 2.

EQUATION 2

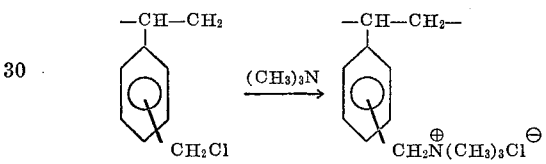

The nature of the tertiary amine is presumably not critical for the performance of the resin. Trimethylamine was chosen because the ease of quaternization is inversely proportional to the size of the amine. Complete conversion to a quaternary resin can readily be achieved by treatment of the chloromethyl polystyrene in dioxane solution with excess trimethylamine at room temperature for 24 hours. Trimethylamine is conveniently applied as a 20% solution in dioxane. The product precipitates from solution before the quaternization is complete. Addition of methanol will bring the polymer back into solution so that the reaction can go to completion. The final product is then recovered by adding the reaction mixture to stirred diethylether or petroleum ether. The product precipitates in the form of a viscous, sticky white gum which hardens gradually upon prolonged stirring with the precipitant as the methanol is being extracted from the resin. The material is broken up mechanically and dried at 40–50° C. in vacuo.

Our carbon dioxide sensor can be formed by applying successive elements from various organic solutions after which each solution solvent is evaporated. The application of the successive layers is preferably accomplished by a series of immersion or application coating steps.

With reference to the single figure of the drawing a carbon dioxide sensor is formed in accordance with our invention by employing a 20 mil palladium wire 11 as the base or support upon which the successive elements are applied. This wire is the first elongated flexible current collector 11 of the sensor. The wire has its central portion immersed in a solution of Alkanex polyester resin lacquer to apply a first layer of electrical insulation 13 on current collector 11. It will be appreciated, of course, that a tube of insulation could be applied over the central portion of the current collector by slipping the tube over the collector. Opposite ends of wire 11 are exposed and not coated by insulation 13. A first electrochemically active region 12 is formed in electrical contact with current collector 11 by roughening one exposed end of the current collector by sand blasting and then applying lightly platinum black by electrocoating. The opposite exposed end (not shown) is provided for subsequently applying an electrical lead thereto.

A second elongated flexible current collector 14 of silver or gold is applied to surround the first current collector 11 by applying, such as by painting or plating, the silver or the gold thereon. Second active region 15 at the one end of the collector is silver and silver chloride which silver chloride is applied to silver current collector 14 by a chloriding step such as anodization in a chloride solution. If gold is employed as second current collector 14, silver is deposited electrochemically and then silver chloride is formed on its surface. A second layer of electrical insulation can be applied over second current collector 14 except for a small region at the upper end for subsequently applying an electrical lead thereto. However, we prefer to employ the subsequently applied carbon dioxide diffusion barrier in this manner thereby eliminating the need for a separate electrically insulating coating on collector 14. The lower end of the structure with electrochemically active regions 12 and 15 is immersed in a solution of quaternized polystyrene in the initial chloride form thereby forming ion exchange resin electrolyte 16. Electrolyte 16 is in contact with both regions 12 and 15.

Electrolyte 16 is converted to a partially bicarbonate form and a partially chloride form by immersion in an aqueous $KCl-KHCO_3$ solution, and the first electrically active region 12 is charged. During the equilibration of the electrolyte, the palladium is charged with hydrogen by using a current of 0.5 to 1.0 milliampere for ten to fifteen minutes employing an auxiliary platinum electrode in the same solution. The device is then rinsed briefly in water and dried in a flowing nitrogen gas for about 1 minute at 50° C. A diffusion barrier of silicone-polycarbonate is then applied as an outer sheath 17 encapsulating the electrically active regions 12 and 15, electrolyte 16, and second current collector 14. Active region 12 requires an environment whereby no oxidizing agent permeates through sheath 17.

The resulting carbon dioxide sensor can be used for clinical or other analysis. A high impedance voltmeter is connected to the respective electrodes. The terminal voltage from the sensor in operation will be a function of the carbon dioxide partial pressure in equilibrium with it.

Examples of carbon dioxide sensors made in accordance with our invention are as follows:

EXAMPLE 1

Three carbon dioxide sensors were formed in accordance with the above description and as shown generally in the single figure of the drawing. The current collector was in the form of a 20 mil palladium wire which was immersed in a solution of Alkanex polyester resin lacquer except for about 1 centimeter at each end. The coated wire was heated at a temperature of 100° C. to evaporate the solvent and then to 200° C. to crosslink the coating. This coating step was repeated several times. One exposed end of the current collector was then roughened by sand blasting and platinum black was then applied by being electrocoated lightly thereon to provide the first electrochemically active region. The second current collector was applied in the form of a silver wire in spiral fashion around the first insulation. The second electrochemically active region was in the form of a closer spiral of the same wire which had been chlorided by anodization in 0.1 N HCl acid solution using a platinum flag as a counter electrode. After the second electrochemically active region had been formed, the lower end of each structure had applied thereon an ion exchange resin electrolyte. The first structure had applied thereon a terpolymer of methyl methacrylate, divinylbenze, and 2-hydroxy-3-trimethylammonium, propyl methacrylate in the chloride form having an ion exchange capacity of about 0.7 milliequivalent per gram. The second and third structures had applied thereon quaternized polystyrene in the chloride form having an ion exchange capacity of 1.4 milliequivalents per gram. The electrolyte layer was applied by immersing the lower end of the structure in a solution of the resin in a mixture of chloroform-methanol to contact both electrochemically active regions. The structures were then heated in nitrogen at 50° C. for 10 minutes to eliminate any residual solvents.

Each electrolyte was converted to a partially bicarbonate form and partially chloride form, and the first electrically active region was charged. The conversion of the electrolyte and the charging of the first active region was accomplished by immersing the structure in an aqueous 0.1 M KCl-0.1 M $KHCO_3$ solution to convert the electrolyte to a mixed bicarbonate-chloride form of resin. During this equilibration of the electrolyte, the palladium was charged with hydrogen by using a current of between 0.5 to 1.0 milliampere for about 15 minutes employing a platinum electrode in the same solution. The structure was then rinsed briefly in water and dried for about 1 minute in flowing nitrogen gas at 50° C. The structure was now provided with a first electrochemically active region of hydrided palladium with a surface coating of platinum black.

A second layer of electrical insulation was then applied over the second current collector of each device by immersing the structure in a solution of methyl-phenyl siloxane, Viton hexafluoropropylene-vinylidene fluoride rubber and a silicone-polycarbonate resin, respectively. Each of these materials is both a diffusion barrier material and has electrical insulation properties. Each of the structures was covered with the same respective material whereby in addition to a layer being formed over the second current collector a carbon dioxide diffusion barrier also encapsulated both of the electrically active regions and the electrolyte. Each of the resulting structures was a carbon dioxide sensor.

EXAMPLE 2

Two carbon dioxide sensors were formed generally in accordance with Example 1 above employing the same type of terpolymer as the electrolyte. However, the second current collector was gold which was applied by painting onto the first insulation. After application of the gold paint, silver was deposited electrochemically as a 5 millimeter wide region at the lower end of the current collector. The silver depositing was accomplished by employing a commercial cyanide bath which used a silver wire anode at 1 milliampere for one thousand seconds. After the end of the structure had been rinsed in water, the surface of the silver was chlorided anodically at a current of 0.5 milliampere using a 0.1 N HCl bath with a platinum electrode serving as the counter electrode. The sequence of the chloriding was 2 minutes anodic, 2 minutes cathodic and 10 minutes anodic.

Further, the second layer of electrical insulation was applied over the second current collector by immersing the structure in a solution of methyl-phenyl siloxane. This material is both a diffusion barrier and has electrical insulating properties. Each of the structures was covered with the same material whereby in addition to a layer being formed over the second current collector a carbon dioxide diffusion barrier also encapsulated both of the electrically active regions and the electrolyte. Each of the resulting structures was a carbon dioxide sensor.

EXAMPLE 3

A carbon dioxide sensor was formed generally in accordance with Example 1 above employing the same type of terpolymer as the electrolyte. However, the second current collector was silver which was applied by painting onto the first insulation. The lower end of the silver current collector was chlorided anodically as described above in Example 2. The second layer of electrical insulation and the diffusion barrier material was methyl-phenyl siloxane as in Example 2. The resulting structure was a carbon dioxide sensor.

EXAMPLE 4

The above 5 sensors formed in Examples 1-3 were tested by measuring their terminal voltage with a high impedance millivoltmeter during equilibration with atmospheres of 100% carbon dioxide, and 2.1% carbon dioxide in nitrogen. In an ideal aqueous electrolyte system containing bicarbonate ion the anticipated voltage change is 59 millivolts per decade change in carbon dioxide partial pressure, or, for the two gases employed, a change of 100 millivolts. The performance of the 6 above-mentioned sensors is set forth below in Table I.

TABLE I

| Sensor Number | Terminal voltage, millivolts (mv.) | | |
|---|---|---|---|
| | $CO_2$ | 2.1% $CO_2$ in $N_2$ | E, mv. |
| 1 (Example 1) | | | 95 |
| 2 (Example 1) | | | >77 |
| 3 (Example 1) | | | ~84 |
| 4 (Example 2) | 550 | 645 | 95 |
| 5 (Example 2) | 597 | 680 | 83 |
| 6 (Example 3) | 595 | 685 | 90 |

It will be noted from the above table that the magnitude of the response of the above 6 sensors is in quite reasonable agreement with the anticipated 100 millivolts response. The time constant for each of the sensors was between 18 and 20 seconds.

While other modifications of the invention and variations thereof which may be embraced within the scope of the invention have not been described, the invention is intended to include such as may be embraced within the following claims:

What we claim as new and desire to secure by Letters Patent of the United States is:

1. A carbon dioxide sensor comprising a first elongated flexible current collector of palladium wire, an electrochemically active region of hydrided palladium with a surface coating of platinum black in electrical contact with a portion of the current collector, a second elongated flexible current collector of silver surrounding at least partially the first current collector, a second electrochemically active region of silver and silver chloride in electrical contact with the second current collector, a first layer of electrical insulation, a polyester resin lacquer disposed between the first and second current collectors, a second layer of electrical insulation of hexafluoropropylene-vinylidene fluoride rubber disposed over the second current collector, an anion exchange resin electrolyte of quaternized polystyrene partially in its bicarbonate form and partially in its chloride form contacting both electrochemically active regions, and an outer sheath of carbon dioxide diffusion barrier material of hexafluoropropylene-vinylidene fluoride rubber encapsulating at least the electrochemically active regions and the electrolyte.

2. A carbon dioxide sensor comprising a first elongated flexible current collector in the form of a palladium wire, an electrochemically active region of hydrided palladium with a surface coating of platinum black in electrical contacts with a portion of the current collector, a second elongated flexible current collector of silver surrounding at least partially the first current collector, a second electrochemically active region of silver and silver chloride in electrical contact with the second current collector, a first layer of electrical insulation of a polyester resin lacquer disposed between the first and second current collectors, a second layer of electrical insulation of silicone polycarbonate disposed over the second current collector, an anion exchange resin electrolyte of quaternized polystyrene partially in its bicarbonate form and partially in its chloride form contacting both electrochemically active regions, and an outer sheath of carbon dioxide diffusion barrier material of silicone polycarbonate encapsulating at least the electrochemically active regions and the electrolyte.

3. A carbon dioxide sensor comprising a first elongated flexible current collector in the form of a palladium wire, an electrochemically active region of hydrided palladium with a surface coating of platinum black in electrical contact with a portion of the current collector, a second elongated flexible current collector of silver surrounding at least partially the first current collector, a second electrochemically active region of silver and silver chloride in electrical contact with the second current collector, a first layer of electrical insulation of a polyester resin lacquer disposed between the first and second current collectors, a second layer of electrical insulation of silicone polycarbonate disposed over the second current collector, an anion exchange resin electrolyte of a terpolymer of methyl methacrylate, divinylbenzene and 2-hydroxy-3-trimethylammonium propyl methacrylate partially in its bicarbonate form and partially in its chloride form contacting both electrochemically active regions, and an outer sheath of carbon dioxide diffusion barrier material of silicone polycarbonate encapsulating at least the electrochemically active regions and the electrolyte.

References Cited
UNITED STATES PATENTS

| | | | |
|---|---|---|---|
| 3,098,813 | 7/1963 | Beebe et al. | 204—195 |
| 3,134,697 | 5/1964 | Niedrach | 136—86 F |
| 3,278,408 | 10/1966 | Leonard et al. | 204—195 |
| 3,382,105 | 5/1968 | McBryar et al. | 136—86 F |
| 3,415,730 | 12/1968 | Haddad | 204—195 |
| 3,539,455 | 11/1970 | Clark | 204—1 T |

TA-HSUNG-TUNG, Primary Examiner